US008766602B1

(12) United States Patent
Kimes

(10) Patent No.: US 8,766,602 B1
(45) Date of Patent: Jul. 1, 2014

(54) SELF PROTECTING PRE-CHARGE CIRCUIT

(75) Inventor: Justin Ian Kimes, Indianapolis, IN (US)

(73) Assignee: Enerdel, Inc., Greenfield, IN (US)

( * ) Notice: Subject to any disclaimer, the term of this patent is extended or adjusted under 35 U.S.C. 154(b) by 314 days.

(21) Appl. No.: 13/220,126

(22) Filed: Aug. 29, 2011

Related U.S. Application Data

(60) Provisional application No. 61/378,140, filed on Aug. 30, 2010.

(51) Int. Cl.
*H02J 7/00* (2006.01)
(52) U.S. Cl.
USPC .......................................... 320/137; 320/160
(58) Field of Classification Search
USPC ....................................................... 320/137
See application file for complete search history.

(56) References Cited

U.S. PATENT DOCUMENTS

| | | | |
|---|---|---|---|
| 4,355,285 A | 10/1982 | Kelley et al. | |
| 4,375,595 A | 3/1983 | Ulmer et al. | |
| 5,059,820 A | 10/1991 | Westwick | |
| 5,619,076 A | 4/1997 | Layden et al. | |
| 5,917,305 A * | 6/1999 | Faulk | 320/106 |
| 5,973,419 A | 10/1999 | Kruppa et al. | |
| 6,118,250 A * | 9/2000 | Hutchison et al. | 320/110 |
| 6,130,488 A | 10/2000 | Hansen et al. | |
| 6,153,851 A | 11/2000 | Schneider | |
| 6,768,621 B2 | 7/2004 | Arnet et al. | |
| 7,314,350 B2 | 1/2008 | Brown | |
| 7,404,459 B2 | 7/2008 | Nakanishi et al. | |
| 7,573,156 B2 | 8/2009 | Paik et al. | |
| 2005/0201032 A1* | 9/2005 | Devine et al. | 361/93.1 |
| 2008/0191667 A1* | 8/2008 | Kernahan et al. | 320/150 |
| 2009/0027013 A1* | 1/2009 | Odaohhara | 320/160 |

FOREIGN PATENT DOCUMENTS

| | | |
|---|---|---|
| DE | 202006003587 | 5/2006 |
| DE | 102010001275 | 2/2011 |
| JP | 2005253154 | 9/2005 |

OTHER PUBLICATIONS

"Thermistor Protection for a Precharge Circuit on Lithium Ion Batteries"; http://www.ametherm.com/inrush-current/thermistor-protection-precharge-circuit-lithium-ion-batteries (assessed Aug. 1, 2011).
Tsai, Chia-Chun, et al.; "A multi-mode LDO-based Li-ion battery charger in 0.35 μm CMOS technology"; The 2004 IEEE Asia-Pacific Conference on Circuits and Systems, 2004, vol. 1, no., pp. 49-52 vol. 1, 6-9; Dec. 2004.
Mammano, R. A.; "Charging the new batteries—IC controllers track new technologies"; Proceedings of the Tenth Annual Battery Conference on Applications and Advances, 1995, vol., no., pp. 171-176, 10-13, Jan. 1995.

* cited by examiner

*Primary Examiner* — Arun Williams
(74) *Attorney, Agent, or Firm* — Faegre Baker Daniels LLP

(57) ABSTRACT

A battery charging system includes a pre-charge control circuit for electrically coupling a plurality of power supply terminals to a plurality of load terminals. The pre-charge control circuit includes a plurality of switching elements for selectively coupling at least one of the plurality of power supply terminals and one of the plurality of power supply using one of a pre-charge current path and a standard charge current path. The pre-charge current path includes at least one pre-charge resistor in series with a positive temperature coefficient (PTC) resistor.

7 Claims, 2 Drawing Sheets

SELF PROTECTING PRE-CHARGE CIRCUIT

CROSS REFERENCE TO RELATED APPLICATION

This application claims the benefit of U.S. Provisional Application Ser. No. 61/378,140, filed Aug. 30, 2010, which is expressly incorporated by reference herein.

BACKGROUND

The present invention relates to pre-charging of battery devices and powerlines, and more specifically to a self-protecting, pre-charge circuit.

Pre-charge of the powerline voltages in a high a DC voltage application is a preliminary mode in which current from the power source is limited such that a controlled rise time of the output voltage during power up is achieved. Pre-charging reduces the electrical hazards which may occur when the system integrity is compromised due to hardware damage or failure.

Pre-charging is commonly used in high voltage battery charging applications. For example, a conventional battery charging system typically includes a high voltage/high current charger (i.e., the power supply), a battery management system circuit (i.e., a control circuit, contactors, capacitors, resistors, etc), and load circuits (i.e., inductors, capacitors and resistors) coupled to the battery. The pre-charge of a high voltage DC bus is necessary in order to slowly (0.1 s to a few seconds) bring the load voltage from 0V to a target voltage (usually, hundreds of volts) in order to be able to close the main high voltage contactors without causing an on rush of current. Such a rush of current can weld such contactors closed and potentially damage the battery or other components in the system.

In general, the energy to perform this pre-charge operation in battery charging systems is typically controlled by a pre-charge circuit that limits the amount of current present on the high voltage bus. In most conventional charging systems, this pre-charge circuit is implemented as a series of contactors or switching elements for selecting between a first current path including a current limiting resistor (the pre-charge resistor) and a second, low resistance path. Thus, during the pre-charge process, the first path is used to limit the amount of current delivered to the high voltage bus. Once pre-charged, the pre-charge circuit can switch to the low resistance path to complete the charging process.

However, in many cases the actual energy in the charging system can be dependent on many factors other than the power supply. For example, there can be unintended high voltage loads or capacitances present in the system. As a result, the is a strong likelihood of the occurrence of a large flow of current that could potentially damage not only the contactors in the system, by also other components, such as the pre-charge hardware or the battery itself. For example, some types of pre-charge resistors can be susceptible to damage from such large currents.

DETAILED DESCRIPTION OF THE DRAWINGS

Figure 1:
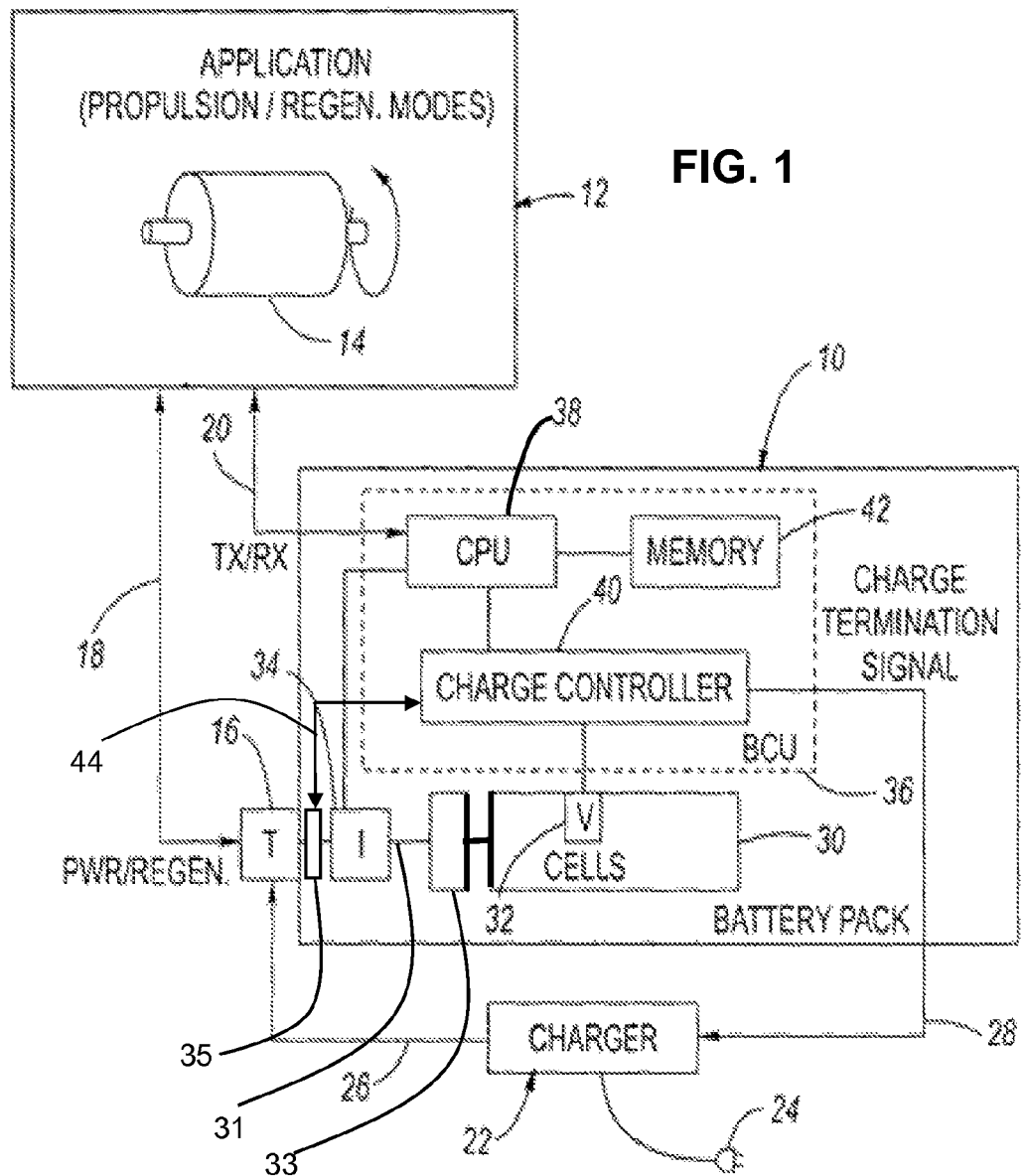
FIG. 1 is a block diagram of a battery-operated system configured in accordance with an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should generally be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, although battery-operated systems can be configured to include a pre-charge circuit for managing the amount of current being delivered to a battery during the pre-charge process, conventional charging systems can still be susceptible to the occurrence of large transient currents during this pre-charge process. To overcome the limitations of such conventional battery charging systems, the various embodiments of the invention provide a new configuration for a pre-charge circuit. Specifically, the various embodiments of the invention provide a modified pre-charge resistor consisting of a conventional pre-charge resistance in series with one or more positive temperature coefficient (PTC) resistors. As used herein, a "PTC resistor" is a resistor that is configured to transition from a low resistance to a high resistance as a function of increasing temperature. In particular, a PTC resistor can have a transition temperature (Tc) at which the nominal resistance of the PTC begins to increase dramatically as a function of temperature.

Referring now to FIG. 1, there is shown a simplified, schematic and block diagram view of an exemplary energy system 10, configured in accordance with an embodiment of the invention, and suitable for use in connection with any one or more of a plurality of exemplary applications 12. Application 12, in the illustrated embodiment, may be of the type employing a dynamoelectric machine 14, which may alternatively be configured for operation (i) in a first mode wherein the machine 14 is used for propulsion torque, or (ii) in a second mode different from the first mode wherein the machine 14 is configured for the production of regenerative energy (i.e., it is configured as a generator). For example, such applications may include, but are not limited to, self-propelled vehicle applications, although other application stationary in nature (i.e., rotating systems having loads with inertia) are also included within the spirit and scope of the invention. Dynamoelectric machine 14 may comprise conventional apparatus known to those in the art, for example only, AC or DC electric motors, brush-based or brushless electric motors, electromagnet or permanent magnetic based electric motors, reluctance-based electric motors, or the like. It should be clearly understood that the foregoing is exemplary only and not limiting in nature.

Energy system 10 can be configured to include measurement devices, including but not limited to devices 32 and 34, and processing devices, such as Battery Control Unit (BCU) 36, for measuring and analyzing predetermined electrical characteristics of power, such as voltage and current, drawn by application 12 from energy system 10 as a function of time. Energy system 10 can be further configured to use such measurements and analysis to allow energy system 10 to both "self-learn" the type of load profile presented to it by application 12, and to determine a charging strategy in accordance with that particular load profile. The present invention can, therefore, adapted to establish a way for energy system 10 to maximize performance by continuously adapting its charging regimen to the particular type of load profile, whether energy-based or power-based, being presented to it, as opposed to utilizing fixed routines. By utilizing the functionality of this invention, users of energy system 10 are thereby able to extract optimal performance from energy system 10 that is otherwise unattainable.

With continued reference to FIG. 1, energy system 10 can include at least one input/output terminal 16, designated "T" (for Terminal) in the drawings. A power bus 18, designated "PWR/REGEN." in the drawings, is configured to allow electrical power to be drawn from energy system 10, via terminal 16, when dynamoelectric machine 14 is operated in a first, propulsion torque mode. Power bus 18 alternatively can be configured or used to carry electric energy, hereinafter referred to as regenerative energy, produced by dynamoelectric machine 14 when operated in the second, regenerative energy production mode (as a generator). As further shown, in the illustrated embodiment, energy system 10 may also include a communications port configured for connection to a communications line 20, designated "TX/RX" (transmit/receive) in FIG. 1. Communications line 20 can be configured for bi-directional communications, for example control signals or control messages, between energy system 10 and application 12.

FIG. 1 also shows an electrical battery charger 22, including in exemplary fashion a conventional electrical plug 24 for connection to a wall outlet (not shown) or the like. Charger 22 can be configured for charging (or recharging) energy system 10. Charger 22 can include a charging power line 26 configured for connection to energy system 10 for charging (or recharging) the energy storage devices making up energy system 10, although for simplicity sake, line 26 is shown connected to the I/O terminal 16 (PWR/REGEN.). In addition, charger 22 can have an input configured to receive a control signal, such as a charge termination signal, on a control line 28 from energy system 10. The charge termination signal on line 28 can be configured to cause charger 22 to discontinue charging energy system 10 (i.e., to stop charging), for example, when the energy system 10 has been charged to a calculated level according to the invention, as described in greater detail below. Alternatively, charger 22 may be a variable charger 22 wherein the control signal on line 28 is operative to adjust the charging current as well as to terminate the charge current. Charger 22 can comprise conventional charging components known to those of ordinary skill in the art. For example, charger 22 can include a DC power supply or source and a plurality of contactor circuits for coupling the DC power supply to terminal 16.

In the illustrated embodiment, energy system 10 includes one or more battery cells 30, a power bus 31 for coupling cells 30 to terminal 16, at least one voltage monitoring device 32, at least one current monitoring device 34 and an Battery Control Unit (BCU) 36. BCU 36 may include a central processing unit (CPU) 38, a charge controller 40, and a memory 42.

Cells 30 are configured to produce electrical power, and can be arranged so that the collective output thereof is provided on I/O terminal 16 via battery load circuit 33, as in the illustrated embodiment. Conventional electrical current flows out of terminal 16 to the load (i.e., the dynamoelectric machine 14) in application 12. Cells 30 are also configured to be chargeable or rechargeable, for example, by receiving conventional electrical current into energy system 10 at I/O terminal 16. The charging current for cells 30 may be from either charger 22 or from machine 14 operating as a generator. The charging current at terminal 16 can then be passed via bus 31 to the battery load circuit 33, which then generates a voltage and current for charging cells 30. Cells 30 can comprise cells fabricated using any type of chargeable and/or rechargeable battery technologies. For example these can include, but are not limited to, lead-acid, nickel cadmium (NiCd), nickel metal hydride (NiMH), lithium ion (Li-ion), and lithium ion polymer (Li-ion polymer) technologies. However, the various embodiments of the invention are not limited in this regard and can also be utilized with battery cells using any other or future rechargeable battery technologies. In the illustrated embodiment, cells 30 are arranged to produce a direct current (DC) output at a predetermined, nominal level after charging.

Voltage monitoring device 32 can be configured to measure the voltage level being drawn by application 12 from energy system 10, and to produce a voltage indicative signal representative of the detected voltage. In the various embodiments of the invention, at least one voltage monitoring device 32 is provided to detect the overall voltage output of the combination of cells 30. However, a plurality of voltage monitoring devices 32 (the plurality not being shown for clarity) can also be employed for each individual cell included in energy system 10. Voltage monitoring device(s) 32 may comprise conventional apparatus known in the art.

Current monitoring device 34 is configured to detect the current level being drawn by application 12 from energy system 10, and to generate, in response, a current indicative signal representative of the measured current level. Current monitoring device 34 may comprise conventional apparatus known in the art.

Battery Control Unit (BCU) 36 is configured for controlling the overall operation of energy system 10, including the adjustments to the charging strategy according to the invention. BCU 36 may include a central processing unit (CPU) 38, a charge controller 40, and a memory 42.

To provide control of the charging process in system 10, system 10 can include a pre-charge circuit 35 for controlling how a device charging the cells 30 (e.g., devices 12 or 22) and coupled to terminal 16 is coupled to cells 30 via bus 31. In particular, the pre-charge circuit 35 can be used to control the current being delivered to cells 30. The pre-charge circuit 35 can be controlled via control signals on lines 44, generated by the BCU 36.

Figure 2:
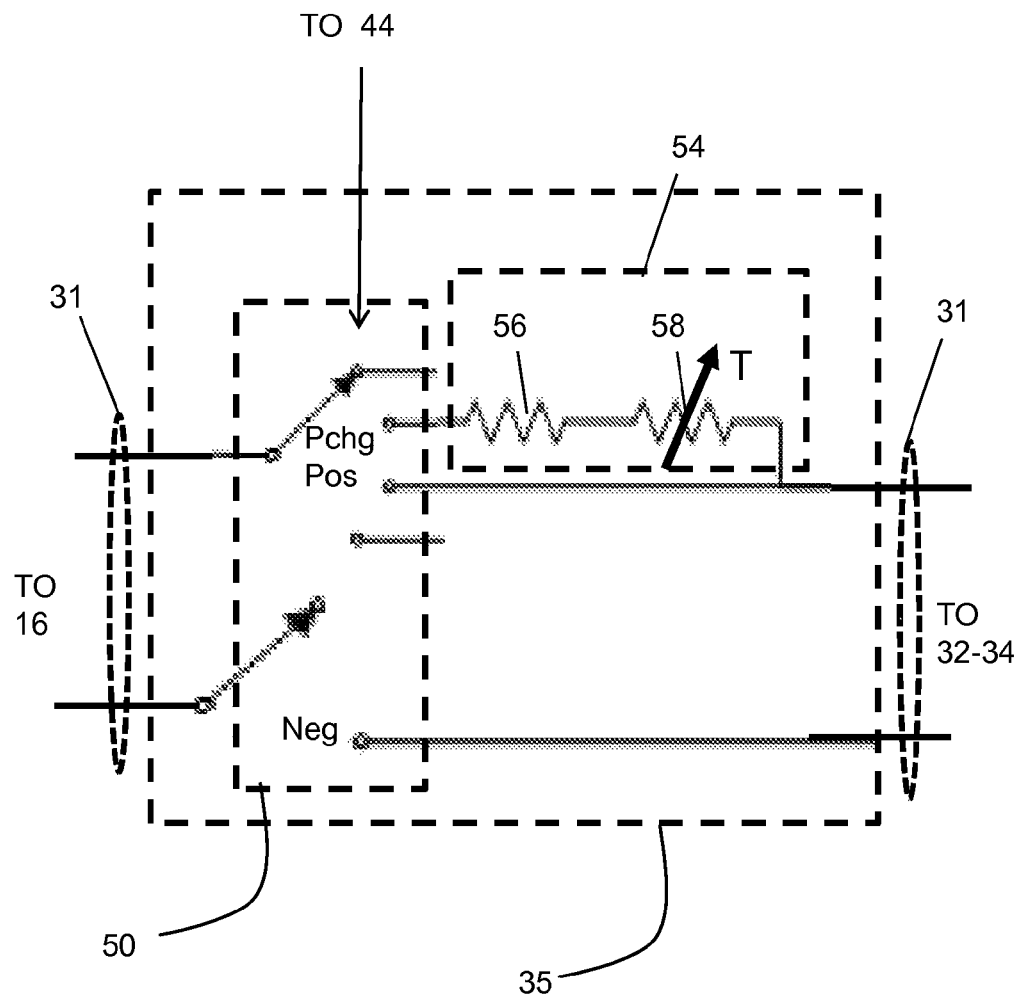
FIG. 2 is a schematic illustration of an exemplary pre-charge circuit in accordance with the various embodiments of the invention for the system in FIG. 1.

An exemplary configuration a pre-charge circuit 35 in accordance with the various embodiments of the invention is shown in FIG. 2. As shown in FIG. 2, the circuit 35 includes a plurality of contactors 50 (Pchg, Pos, Neg) controlled by a signal on line 44. The contactors 50 can be used to directly connect (by closing Pos and Neg and opening Pchg) or completely disconnect cells 30 from terminal 16 (by opening Pchg, Pos and, Neg). Further, the contactors 50 can also be used to connect cells 30 to terminal 16, via bus 31, by means of a pre-charge current path 54 (by closing Pchg and Neg and opening Pos).

In the various embodiments of the invention, the pre-charge current path 54 consists of the series combination of at least one low power, pre-charge resistor 56 and a PTC resistor 58. In the various embodiments, the pre-charge resistor is a resistor provides approximately the same resistance (i.e., varies by less than 10%) over a wide range of temperatures.

Further, the pre-charge resistor is a low power rated resistor. That is, a pre-charge resistor is selected according to conventional methods for selecting a resistor to handle one or more pre-charge current pulses having a pre-defined current, rise time, and pulse length, without regard to the possible existence of parasitic loads, capacitances, or any other potential sources of high current. In other words, the pre-charge resistor is essentially rated for the ideal or as-designed operation the system 10.

The pre-charge current path 54 operates as follows. As current flowing through PTC resistor 58 is increased, PTC resistor 58 will have increasingly higher resistive losses. In a PTC resistor, such resistive losses will result in the generation of heat. Accordingly, as the current through PTC resistor 58 begins to rise, the temperature of PTC resistor 58 will also begin to rise. Accordingly, during an inrush of current, the PTC resistor 58 will have large resistive losses, resulting in a significant amount of heating and a significant increase in temperature. If the inrush of current is sufficiently high, the heating will cause the PTC resistor 58 temperature to rise past its transition temperature. Past the transition temperature, the PTC resistor 58 will transition from a nominal resistance state to a high resistance state (i.e., at least a 10× increase). This increase in resistance effectively provides an open in the pre-charge current path 54. The open circuit thus halts the flow of current through pre-charge path 54, protecting the resistor 56 and other components from further damage due to excessive currents. Once the PTC resistor 58 cools to a temperature below its transition temperature, the current path 54 is closed and the pre-charging process can continue or being again.

In a conventional pre-charge circuit, the circuit is configured to provide a selected resistance in order to provide the necessary amount of current limiting. Accordingly, in the various embodiments of the invention, the nominal resistance of the pre-charge path 54 can be selected in the same manner and thus the resistance of resistors 56 and 58, can be selected based on the nominal resistance of PTC resistor 58 (i.e., a resistance at temperatures below the transition temperature of the PTC resistor 58). Further, the resistances of resistors 56 and 58 can be selected such that the PTC resistor 58 transitions to the high resistance state prior to power rating of the pre-charge resistor 56 being exceeded. That is, the PTC resistor 58 is selected such that the current required for heating the PTC resistor 58 beyond its transition temperature is less than a current that would damage or otherwise adversely affect the operation of resistor 56.

In some configurations, the resistances of resistors 56 and 58 can be substantially equal (i.e., within 20%). However, in preferred embodiments of the invention, the resistance of resistor 56 can be substantially greater than the nominal resistance of PTC resistor 58 (i.e., 80% or less). For example, in one preferred embodiment, the ratio of the resistance of resistor 56 and the nominal resistance of PTC resistor 58 can be 10:1.

High resistance ratios provide several advantages. First, a high resistance ratio provides a pre-charge circuit in which the pre-charge process is primarily controlled by the conventional pre-charge resistor. As a result, greater control of the pre-charge process can be provided since conventional pre-charge resistors can typically provide more stable resistance values over a wide range of temperature as compared to PTC resistor. Thus, the pre-charge circuit can be designed primarily with the pre-charge resistor in mind, to provide the necessary current limiting, and the smaller resistance PTC resistor can be added to provide protection.

Second, a higher resistance ratio ensures better protection of the pre-charge circuit and other components. In the case of conventional PTC resistors, higher nominal resistances typically correlate to higher transition temperatures. Further, because of manufacturing variability, the transition temperature of a particular PTC resistor can vary. Additionally, the rate of change in resistance of in PTC resistors can also vary. As a result, if a high nominal resistance PTC resistor is selected, the nominal transition temperature will start to come too close to the temperature at which the pre-charge resistor will be damaged, fail, or be otherwise adversely affected. Thus, if a particular PTC resistor has a slightly higher actual transition temperature, the transition to a high resistance state may occur above a temperature corresponding to a current level that can damage the pre-charge resistor. Similarly, if a particular PTC resistor has a rate of resistance change that is too low, even if the transition begins at the correct temperature, the low rate of change may still allow a damaging current level prior to the PTC resistance providing a high resistance.

However, extremely high resistance ratios (~15:1 or higher) can also provide some disadvantages. In particular, a conventional PTC resistor with a low nominal resistance typically correlates to a low transition temperature. As a result, when the resistance of the PTC resistor is too low, the amount of current increase required to cause the PTC resistor to enter the high resistance state may be too low. Accordingly, an excessive number of pre-charge failures may occur.

In the case of low resistance ratios (e.g., ratios of 1:1.5 or lower), the pre-charge circuit 54 would operate as if the PTC resistor 58 is the pre-charge resistor. In such configurations, the issue is timing. Normally, a vehicle manufacturer will require the high voltage bus to be charged to a certain percentage of the high voltage battery within a specified amount of time. That is, a quantity of pre-charge attempts need to be allowed within a certain period of time is also required since a user of a vehicle would not want to wait several minutes before they can attempt to start their car again. Additionally, a large PTC resistor would require a significant amount of time before a second pre-charge attempt could be made since the PTC resistor would have to dissipate all of the energy during a pre-charge cycle. Further, if sufficient cooling has not occurred, the resistance could be higher during the second pre-charge attempt. This can cause the amount of time necessary to pre-charge the bus to a percentage of the battery pack voltage to increase significantly.

A pre-charge circuit 54 with resistance ratios between 1:1.5 and 15:1 provides several advantages. Primary, to deal with parasitic resistances forming across the load for charging the battery, a conventional pre-charge resistor of a single PTC resistor with an extremely high power rating would have to be provided in a conventional pre-charge circuit in order to handle a high voltage source (typically >300V). The problem with such a solution becomes size. In order to meet the power requirements necessary, such resistors are generally physically large and are typically associated with a higher cost. Such increased space and cost requirements are generally contrary to the requirements for a battery pack for an electric vehicle, as space and weight are not a luxury.

It is worth noting that is some embodiments of the invention a resistance outside the range listed above may be necessary. That is, in cases where the capacitance of the buses being charged have significantly higher or lower capacitances, higher or lower resistance ratios may be necessary. In such cases, the range can be as large as 1:2 to 20:1.

Therefore, by providing the above-described combination of a lower power rated resistor and a PTC resistor, cost and space requirements are reduced as compared to conventional, higher power rated pre-charge resistors. In particular, the combination above occupies less space and is lighter that a high power rated pre-charge resistor. Additionally, the combination above can be provided at a lower cost.

Further, since the PTC heats up as a function of the current flowing through it and since the current never decays to zero, as is the case in a purely capacitive load, this allows the pre-charge circuit to have the maximum energy rating per unit volume while at the same time allows the power rating of the pre-charge resistor to remain very small and therefore allows the overall size and weight of the circuit to be minimized relative to conventional resistors.

Additionally, the combination above also provides an automatic hardware protection mode that requires no software intervention and never has to be replaced. That is, the PTC resistor operates as a self-resetting fuse. Accordingly, the only additional requirement this circuit adds is a cool down time in the event of a fault mode. This is typically only a couple minutes for most conventional PTC resistors. In many cases, such additional cool down time will be virtually transparent to the user of the vehicle.

Although FIG. 2 shows one exemplary configuration for pre-charge circuit, the invention is not limited in this regard. Rather, other configurations for the pre-charge circuit can be used in the various embodiments of the invention without limitation.

In the various embodiments of the invention, various types of PTC resistors and conventional pre-charge resistors can be used. For example, in one embodiment of the invention, the pre-charge resistor 56 can be a low power rated ceramic resistor and the PTC resistor 58 can be a conventional inrush current limiting PTC resistor, such as the B5910 series of PTC thermistors manufactured by EPCOS AG, of Munich, Germany. However, the invention is not limited in this regard and other types of pre-charge and PTC resistors can be used without limitation. Additionally, although FIG. 2 illustrates a single pre-charge resistor and a single PTC resistor, the invention is not limited in this regard as well. Rather, in the various embodiments of the invention, each of resistor 56 and PTC resistor 58 can be implemented using any number of components. For example, in one combination, resistor 56 is a parallel combination of two or more ceramic resistors and PTC resistor 58 is a parallel combination of two or more PTC resistors. However, the invention is not limited in this regard and other arrangements of components that result in a series arrangement of a pre-charge resistor portion and a PTC resistor portion can be used without limitation.

In FIG. 1, bus and/or line components 18, 20, 26, 28, 31, and 44 are shown as single lines. However, this is for illustrative purposes only. One of ordinary skill in the art will recognize that each of these components can represent any number of connections between two or more components. For example, as shown in the exemplary configuration for FIG. 2, bus 31 is shown as providing a high voltage line (coupled to Pchg and Pos) and a low or reference voltage line (coupled to Neg). Similarly, line 44 provides lines for transmitting signals to pre-charge circuit 35 for controlling contactors 50 and lines for transmitting the load voltage readings back to BCU 36.

Applicants present certain theoretical aspects above that are believed to be accurate that appear to explain observations made regarding embodiments of the present invention of the invention. However, embodiments of the present invention of the invention may be practiced without the theoretical aspects presented. Moreover, the theoretical aspects are presented with the understanding that Applicants do not seek to be bound by the theory presented.

While various embodiments of the present invention have been described above, it should generally be understood that they have been presented by way of example only, and not limitation. Numerous changes to the disclosed embodiments of the present invention can be made in accordance with the disclosure herein without departing from the spirit or scope of the invention. Thus, the breadth and scope of the present invention should generally not be limited by any of the above described embodiments of the present invention. Rather, the scope of the invention should generally be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. For example, details regarding some embodiments of the present invention are described in the document attached hereto as "APPENDIX A". The contents of APPENDIX A are hereby incorporated by reference in their entirety.

The terminology used herein is for the purpose of describing particular embodiments of the present invention only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should generally be interpreted as having a meaning that is consistent with their meaning in the context of the relevant art and will not be interpreted in an idealized or overly formal sense unless expressly so defined herein.

What is claimed is:

1. A pre-charge circuit, comprising:
   first and second power supply terminals for coupling a power supply;
   first and second load terminals for coupling a plurality of battery cells to be charged;
   a first current path for coupling the first of the supply terminals to the first of the load terminals;
   a second current path for coupling the second of the supply terminals to the second of the load terminals;
   a third current path for coupling the first of the supply terminals to the first of the load terminals; and
   a plurality of switching elements for selective opening and closing each of the first, second, and third current paths; and
   a control element for controlling the plurality of switching elements,
   wherein the third current path comprises at least one pre-charge resistor in series with a positive temperature coefficient (PTC) resistor, and wherein a transition temperature of the PTC resistor is configured to correlate with a first current through the PTC resistor that is lower than a second current required for adversely affecting the pre-charge resistor, and wherein the precharge resistor is rated for handling a pre-defined pre-charge pulse.

2. The circuit of claim 1, wherein a nominal resistance of PTC resistor is substantially equal or less than a resistance of the pre-charge resistor.

3. The circuit of claim 1, wherein the nominal resistance of the PTC resistor is less than or equal to 1/10 of the resistance of the pre-charge resistor.

4. The circuit of claim 1, wherein the nominal resistance of the PTC resistor is at least 1/15 of the resistance of the pre-charge resistor.

5. The circuit of claim 1, wherein a ratio of the resistance of the pre-charge resistor to the nominal resistance of the PTC resistor is up to 1:1.5.

6. The circuit of claim 1, wherein a ratio of the resistance of the pre-charge resistor to the nominal resistance of the PTC resistor is between 1:1.5 and 15:1.

7. The circuit of claim 1, wherein a ratio of the resistance of the pre-charge resistor to the nominal resistance of the PTC resistor is between 1:2 and 20:1.

* * * * *